Patented Nov. 17, 1931

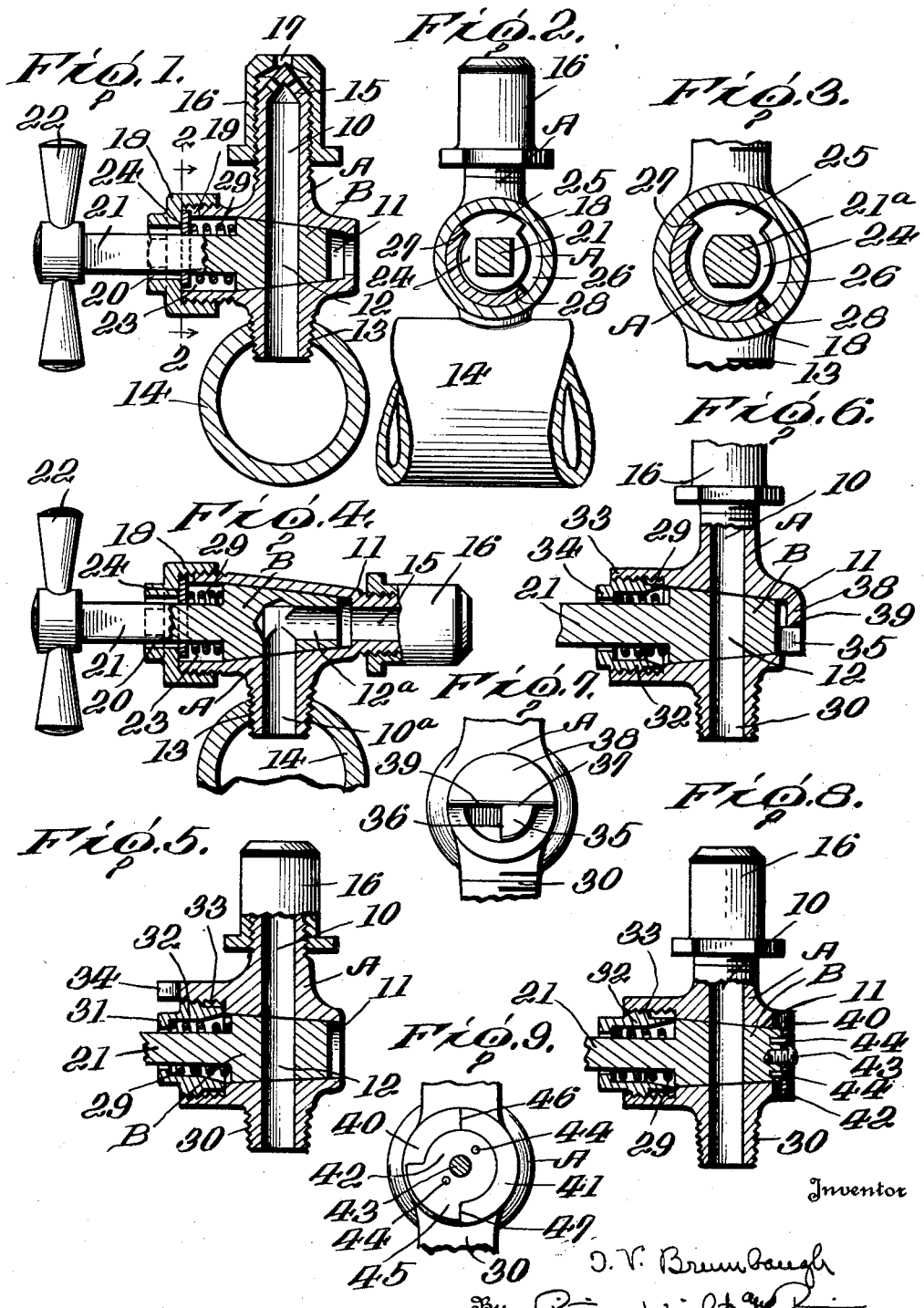

1,832,688

UNITED STATES PATENT OFFICE

ISAAC VERNON BRUMBAUGH, OF ST. LOUIS, MISSOURI, ASSIGNOR TO AMERICAN STOVE COMPANY, OF ST. LOUIS, MISSOURI, A CORPORATION OF NEW JERSEY

VALVE

Application filed March 21, 1930. Serial No. 437,844.

This invention relates to improvements in valves, the invention being more specifically directed to valves of the rotary plug type.

The present valve has been primarily conceived and intended for use in connection with gas stoves for controlling the flow of gas from the supply manifold to the gas burners. The constructions illustrated and described are what might be termed short couple valves, inasmuch as they are very compact in construction, which compactness is highly desirable in a valve which is to be used on a gas stove of the so-called concealed manifold type, such as is illustrated in the Joseph Roy Patent No. 1,643,176, dated September 20th, 1927.

In the concealed manifold type of gas ranges, the space in which to place the valve is very limited and, hence, it is highly desirable for the valve to be very compact as to structure.

The primary object of the present invention is the provision of a valve of novel construction.

A further object of the invention is the provision of a valve of the rotary plug type, which is of a novel construction.

A still further object of the invention is the provision of a valve of the rotary plug type in which is provided a novel means for holding the plug upon its seat under spring tension.

A still further object of the invention is the provision of a valve of the rotary plug type in which there is provided a novel construction of stop for the rotary plug.

Other novel features of construction and improved results of the invention will appear in the following description and accompanying drawings.

In the drawings:

Figure 1 is a vertical sectional view of the valve built in accordance with the invention.

Fig. 2 is a transverse vertical sectional view taken on the line 2—2 of Fig. 1.

Fig. 3 is a fragmentary transverse sectional view showing a slightly modified form of the valve construction appearing in Figs. 1 and 2 of the drawings.

Fig. 4 is a vertical sectional view of a valve built in accordance with the disclosure of Fig. 1, but shown as applied to an angle cock.

Fig. 5 is a sectional view illustrating a modified form of valve construction.

Fig. 6 is a sectional view illustrating a valve built in accordance with the construction illustrated in Fig. 5, with a different or modified form of stop for the rotary plug.

Fig. 7 is a fragmentary view in end elevation illustrating the plug stop construction of the valve appearing in Fig. 6 of the drawings.

Fig. 8 is a sectional view illustrating a still further modified form of valve built in accordance with the disclosure of Fig. 5 of the drawings with a still further modified form of stop for the rotary plug.

Fig. 9 is a fragmentary view in end elevation illustrating the plug stop construction of the valve illustrated in Fig. 8 of the drawings.

Describing the valve construction in detail, reference being had to the accompanying drawings and the illustrations of Figures 1 to 3, inclusive, it will be seen that in describing the valve in broad terms, it comprises a housing or casing A, in which is rotatably mounted a tapered valve plug B.

Describing the valve in more detail, it will be seen that the casing or housing A has passageways at right angles to one another, one of which is designated at 10, which is a straight bore, while the other is designated at 11 and is a tapered bore to receive the tapered valve plug B, which plug is provided with a transverse bore or opening 12, which, through the rotation of the plug can be made to register with the straight bore 10 of the housing in the manner illustrated in Fig. 1 of the drawings to form a continuous passageway through the valve housing.

At one end the gas passageway or bore 10 is threadably connected as at 13 with a gas supply manifold or conduit 14, while its opposite end is made in the form of a jet 15, surrounding which is a cap 16 having an outlet orifice 17, which in reality forms a part of the jet construction. This jet end of the valve is intended to discharge into the mixing bell or chamber of a gas burner in a common and well-known manner.

The transverse bore 11 is open at both ends, but at its large end is provided with a cap 18, which is screwthreadedly mounted exteriorly of the bore, as clearly indicated at 19. This cap 18 is provided with an opening 20, through which passes the square or angular shaft 21, which is formed as an integral part of the rotary plug B and extends from the large end thereof. To facilitate rotation of the plug, the shaft 21, at its outer end, carries an operating handle 22.

The rotary plug B is much shorter than the tapered bore 11, with the result that a chamber 23 is present at the large end of the bore between the large end of the plug and the cap 18. The plug shaft 21 passes through this chamber and in this chamber is positioned a washer 24 having an opening of the same configuration as the cross-sectional configuration of the plug shaft and positioned on the plug shaft to rotate therewith. This washer 24 abuts the under side of the cap 18 and has an outwardly extending segmental portion 25, which when the shaft is rotated, moves in the cut-out portion 26 in the end of the bore 11, as clearly illustrated in Figs. 2 and 3 of the drawings. Thus it will be seen that the shoulders 27 and 28 of the bore 11, at the end of the cut-out portion 26 serve as abutments for the segmental portion 23 of the washer and therefore act as positive stops to a complete rotation of the shaft 21 and the plug B. The cut-out portion 26 is of sufficient length to permit a sufficient degree of rotation of the plug to cause the bore or passageway 12 therein to register with the gas passageway 10 of the housing, or to be moved in non-registering position therewith when it is desired to close the gas passageway.

It is, of course, essential to provide means for holding the tapered plug firmly in engagement with the tapered bore to prevent gas leaking and to accomplish this, I have provided a coil spring 29, which surrounds the plug shaft in the chamber 23. This spring exerts a force between the washer 24 and the enlarged end of the tapered plug thus holding it upon its seat at all times under spring tension.

A valve constructed in accordance with the description given has several advantages, one of which is that of compactness; a second of which is a plug stop which is completely enclosed and protected; and a third advantage of giving a completely enclosed and protected spring. This feature of the protection of the stop and spring is of importance, because, especially in a concealed manifold type of gas range, the valves and their working parts are subjected to a very considerable amount of heat. Furthermore, the positioning of the spring in the manner described and illustrated makes a much more compact valve structure than those now known wherein the spring is positioned exteriorly of the valve.

The modification appearing in Fig. 3 is very slight, as the valve structure here is identical to that described, with the exception of the cross-sectional configuration of the plug shaft 21, which in this figure of the drawing is designated as $21^a$.

In Fig. 4 of the drawings, a slight modification of the structure appearing in Fig. 1 is illustrated, as here, the valve is shown in the form of what is commonly termed an angle cock. In this form of the valve there is the same tapered bore 11, in which is rotatably mounted the tapered plug B, having an elongated shaft 21 provided with an operating handle. There is the same chamber 23 having therein the spring 29 and washer 24, with the chamber being closed by the cap 18, provided with the opening 20 for the plug shaft.

I show, however, in this modified structure that the bore or passageway 12 is not a transverse passageway, but is an angular passageway designated as $12^a$, one end of which is in communication with the outlet jet 15, which extends beyond and forms a continuation of the tapered bore 11. The other end of this angular passageway $12^a$ of the plug is adapted for communication with the shortened gas passageway $10^a$ of the housing or casing A. This passageway $10^a$ is threadedly connected, as at 13, with the gas supply pipe or manifold 14 in a similar manner to that illustrated in Fig. 1 of the drawings.

A still further modification of the invention appears in Fig. 5 of the drawings, wherein it will be seen that there is still provided the valve housing or casing A having an elongated bore or gas passageway 10 terminating at one end in an outlet, while its opposite end 30 is intended for connection with a gas supply. At right angles to the passageway 10 a housing is provided with a transverse tapered bore 11, in which is rotatably mounted the tapered valve plug B, having an outwardly extended reduced shaft 21, to which it is intended there should be attached an operating handle. Here again the shaft 21 is surrounded by a coil spring 29, which at one end bears against the enlarged end of the tapered plug, while its opposite end is in abutment with the inturned flange 31 of the nut 33, which nut is internally threaded into the valve casing A, as designated at 33. In this form of invention a stop 34 is formed as a part of the valve casing and parallels the shaft 21 of the valve plug. It is intended that the operating handle carried by the valve plug shaft be provided with an outwardly extending portion which upon the rotation of the plug will come into abutment with this housing stop 34.

Figures 6 and 7 of the drawings illustrate a slight modification of the valve structure appearing in Fig. 5 of the drawings and just described. This modification resides entirely in the stop for the plug. By reference to these figures of the drawings, it will be seen that there is an outwardly extending lug 35 from the small end of the rotary valve plug B and that this lug extends through an open end of the bore 11, so that when the plug is oscillated the opposite sides 36 and 37 of this lug will alternately engage the downwardly extending portion 38 of the valve housing which overhangs one-half of the tapered bore 11 and terminates in a straight edge 39.

The remaining structure of this form of valve is identical with that appearing in Fig. 5 of the drawings and the valve parts are, therefore, designated by similar numerals.

Figures 8 and 9 of the drawings illustrate a still further modification of valve stop construction for the valve illustrated in Fig. 5 of the drawings, so, with the exception of this feature, the remaining portion of the valve structure carries similar numerals to those appearing in Fig. 5 of the drawings.

The valve housing A, surrounding the smaller end of the tapered opening, is cut away throughout half the circumference of the opening as designated at 40 in Fig. 9 of the drawings thereby leaving throughout the remaining circumference of the opening an arc-shaped extension 41.

The small end of the tapered plug is elongated to extend outwardly through the small end of the tapered bore and carries upon its end a washer 42, which can be secured in place in any suitable manner, such as by the screw 43 and guarded against rotation by pins 44. This washer is provided with an arc or segmental-shaped extension 45, which when the plug is rotated is intended to travel in the cutout portion 40, in the valve housing, so that as the valve is oscillated the opposite sides of this segmental portion will alternately abut and be stopped by the ends 46 and 47 of the arc-shaped portion 41 of the housing.

From the foregoing it will be seen that in all forms of the invention a very compact valve is provided and that in every instance the spring which assures a proper and tight seating of the rotary plug valve is completely enclosed and protected.

Having thus described my invention what I claim and desire to secure by Letters Patent is:

A gas valve of the oscillating type comprising a housing having a tapered opening therein, a tapered valve plug in said housing, a gas passageway through the side of the housing adapted for communication with a transverse passageway in the plug, the large end of the tapered passageway of the housing being provided with a cap having an opening therein, the tapered plug being shorter than the tapered housing opening and having extending from its enlarged end a shaft passing loosely through the cap opening and provided externally of the cap with an operating handle, the end wall of the enlarged end of the tapered opening provided with a segmental shaped cutout portion, a washer rotatable with the plug and positioned beneath the cap and closing the opening therein, said washer having an increased diameter throughout a portion of its circumference to provide an extension adapted to move in the segmental shaped cutout portion to act as a stop for the plug, and a coil spring surrounding the plug shaft and positioned between the enlarged end of the plug and the washer for holding the washer tightly against the cap to seal the opening therein and to hold the plug tight in the tapered housing.

In testimony whereof I hereunto affix my signature.

ISAAC VERNON BRUMBAUGH.